US010095035B2

(12) United States Patent
Yoshida et al.

(10) Patent No.: US 10,095,035 B2
(45) Date of Patent: Oct. 9, 2018

(54) OPTICAL ELEMENT, DISPLAY DEVICE, AND MANUFACTURING METHOD FOR OPTICAL ELEMENT

(71) Applicant: SEIKO EPSON CORPORATION, Tokyo (JP)

(72) Inventors: Shohei Yoshida, Shimosuwa-machi (JP); Hayato Matsuki, Suwa (JP); Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 44 days.

(21) Appl. No.: 15/451,812

(22) Filed: Mar. 7, 2017

(65) Prior Publication Data
US 2017/0276945 A1    Sep. 28, 2017

(30) Foreign Application Priority Data
Mar. 28, 2016 (JP) ................... 2016-063258

(51) Int. Cl.
*G02B 27/01* (2006.01)
*F21V 8/00* (2006.01)

(52) U.S. Cl.
CPC ......... *G02B 27/0172* (2013.01); *G02B 6/002* (2013.01); *G02B 6/0035* (2013.01); *G02B 2027/011* (2013.01); *G02B 2027/0125* (2013.01)

(58) Field of Classification Search
CPC .. G02B 27/0172; G02B 6/002; G02B 6/0035; G02B 2027/011; G02B 2027/0125
See application file for complete search history.

(56) References Cited

U.S. PATENT DOCUMENTS

| 2,384,209 | A | 9/1945 | Sukumlyn |
| 4,765,715 | A | 8/1988 | Matsudaira et al. |
| 6,829,095 | B2 | 12/2004 | Amitai |
| 2003/0165017 | A1 | 9/2003 | Amitai |
| 2004/0085649 | A1 | 5/2004 | Repetto et al. |
| 2009/0279180 | A1 | 11/2009 | Amitai et al. |
| 2013/0163089 | A1 | 6/2013 | Bohn |

FOREIGN PATENT DOCUMENTS

| JP | 2004-157520 A | 6/2004 |
| JP | 5817904 B1 | 11/2015 |
| WO | 2016/027442 A1 | 2/2016 |

OTHER PUBLICATIONS

Sep. 22, 2017 extended Search Report issued in European Patent Application No. 17163299.5.

*Primary Examiner* — Jack Dinh
(74) *Attorney, Agent, or Firm* — Oliff PLC

(57) ABSTRACT

An optical element includes a plurality of partially reflecting surfaces which are provided in parallel to each other with intervals, reflect a portion of image light and external light, and transmit another portion of the image light or external light; and a light transmitting member which supports the plurality of partially reflecting surfaces, in which the light transmitting member includes an incident plane that enters the image light and the external light, and an emission plane that emits the image light and the external light, and each of the plurality of the partially reflecting surfaces is disposed so as to be inclined with respect to the incident plane and the emission plane, and has a plurality of regions having different reflectances in an inclination direction.

12 Claims, 10 Drawing Sheets

OPTICAL ELEMENT, DISPLAY DEVICE, AND MANUFACTURING METHOD FOR OPTICAL ELEMENT

BACKGROUND

1. Technical Field

The present disclosure relates to an optical element, a display device, and a manufacturing method for the optical element.

2. Related Art

In recent years, as one type of wearable information devices, an image display device such as a head-mounted display which is used by being worn on the head of a user has been provided. In addition, an image display device capable of displaying both an image generated by a display element and an external image of an observer at the same time, when the observer is wearing the image display device, a so-called see-through type image display device is known. For example, JP-A-2004-157520 below discloses a see-through type display device system in which an image generation unit and a light-guiding member which includes an image extraction system formed of diffraction gratings are provided.

For example, in the display device system of JP-A-2004-157520, it is possible to visually recognize a uniform image, when an observer's eyes are positioned in accordance with the design of the device. However, in a case in which the eyes move parallel to light output from the image display device, the striped pattern of the diffraction grating results in a striped pattern being observed. In addition, there is a problem in that the same situation occurs as in the case when the diffraction grating is present in front of an observer's eyes; namely, light from the outside is diffracted, and an external image is blurry.

SUMMARY

An advantage of some aspects of the embodiment is to provide a display device which can reduce an intensity of striped patterns. Alternatively, another advantage of some aspects of the embodiment is to provide a display device which can relieve a state in which an external image is blurry. Still another advantage of some aspects of the embodiment is to provide a preferable optical element using the above-described display device. In addition, still another further advantage of some aspects of the embodiment is to provide a manufacturing method for the above-described optical element.

According to an aspect of the embodiment, there is provided an optical element which includes a plurality of partially reflecting surfaces which are provided parallel to each other with intervals therebetween, which reflect a portion of image light and a portion of external light, and which transmit another portion of the image light or another portion of external light; and a light transmitting member which supports the plurality of partially reflecting surfaces, in which the light transmitting member includes an incident plane that enters the image light and the external light, and an emission plane that emits the image light and the external light, and each of the plurality of the partially reflecting surfaces is disposed so as to be inclined with respect to the incident plane and the emission plane and has a plurality of regions having different reflectances in the inclination direction.

In the optical element according to the aspect of the embodiment, since each of the plurality of partially reflecting surfaces has a plurality of regions having different reflectances in the inclination direction, it is possible to set the intensity of image light output from each of the plurality of partially reflecting surfaces to be approximately uniform, when the image light passes through at least a part of a partially reflecting surface, is reflected by another partially reflecting surface, and is output. In this manner, it is possible to reduce an intensity of striped patterns resulting from the image light. In addition, when a portion of the external light passes through the partially reflecting surface, and the other portion of the external light is reflected by one partially reflecting surface, reflected again by another partially reflecting surface, and output thereafter, it is also possible to set the intensity of external light output from each of the plurality of partially reflecting surfaces to be approximately uniform. In this manner, it is possible to suppress external images from being blurry.

In the optical element according to the aspect of the embodiment, the angle between the partially reflecting surface and the emission plane may be 45° or more and less than 90°, the partially reflecting surface may include a high reflectivity region which is located on a side near to the emission plane in the inclination direction, and a low reflectivity region which is located on a side far from the emission plane compared with the high reflectivity region in the inclination direction and whose reflectance is lower than that of the high reflectivity region.

According to the configuration, in a case in which the angle between the partially reflecting surface and the emission plane is 45° or more and less than 90°, it is possible to set the intensity of image light output from each of the plurality of partially reflecting surfaces to be approximately uniform. In this manner, it is possible to reduce an intensity of striped patterns resulting from image light.

In the optical element according to the aspect of the embodiment, the angle between the partially reflecting surface and the emission plane may be less than 45°, the partially reflecting surface may include a low reflectivity region which is located on a side near to the emission plane in the inclination direction, and a high reflectivity region which is located on a side far from the emission plane compared with the low reflectivity region, in the inclination direction, and has the reflectance that is higher than that of the low reflectivity region.

According to the configuration, in a case in which the angle between the partially reflecting surface and the emission plane is less than 45°, it is possible to set the intensity of external light output from each of the plurality of partially reflecting surfaces to be approximately uniform. In this manner, it is possible to suppress external images from being blurry.

In the optical element according to the aspect of the embodiment, the partially reflecting surface may be formed of a metal film.

According to the configuration, by setting a film thickness of the metal film to differ according to region, it is possible to form a plurality of regions having different reflectances.

In the optical element according to the aspect of the embodiment, the partially reflecting surface may be formed of a dielectric multilayer film.

According to the configuration, by configuring the dielectric multilayer film so as to differ according to region, it is possible to form a plurality of regions having different reflectances.

According to another aspect of the embodiment, there is provided a display device which includes an image display unit, and a light-guiding unit which guides image light formed by the image display unit, the light-guiding unit including an input unit which enters the image light, a light-guiding body which guides the image light entered from the input unit, and an output unit which emits the image light, the output unit including the optical element according to the aspect of the embodiment.

Since the display device according to the aspect of the embodiment includes the output unit including the optical element according to the aspect of the embodiment, it is possible to realize a display device which can reduce an intensity of striped patterns. Alternatively, it is possible to realize a display device which can relieve a state in which external images are blurry.

In the display device according to the aspect of the embodiment, the output unit may be provided on a face on a viewing side of the light-guiding body.

According to the configuration, it is possible to realize a display device of which a design is easy.

According to still another aspect of the embodiment, there is provided a manufacturing method for an optical element which includes forming a partially reflecting surface with a plurality of regions having different reflectances using a mask, on one face of a light transmitting substrate, and manufacturing an element plate which is formed of the light transmitting substrate on which the partially reflecting surface is formed; layering a plurality of the element plates by causing the partially reflecting surface to face the same direction, and manufacturing a layered body in which the plurality of element plates are layered; and cutting the layered body so that each of the partially reflecting surfaces is inclined with respect to a cutting face, and the plurality of regions are disposed along the inclination direction, and thus manufacturing the optical element.

According to the configuration, it is possible to manufacture an optical element in which striped patterns resulting from the image light can be reduced. Alternatively, it is possible to manufacture an optical element which can suppress images from being blurry resulting from the external light.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

First Embodiment

Hereinafter, a first embodiment will be described with reference to FIGS. 1 to 13.

A display device according to the first embodiment is used as a head-mounted display, for example.

Figure 1:
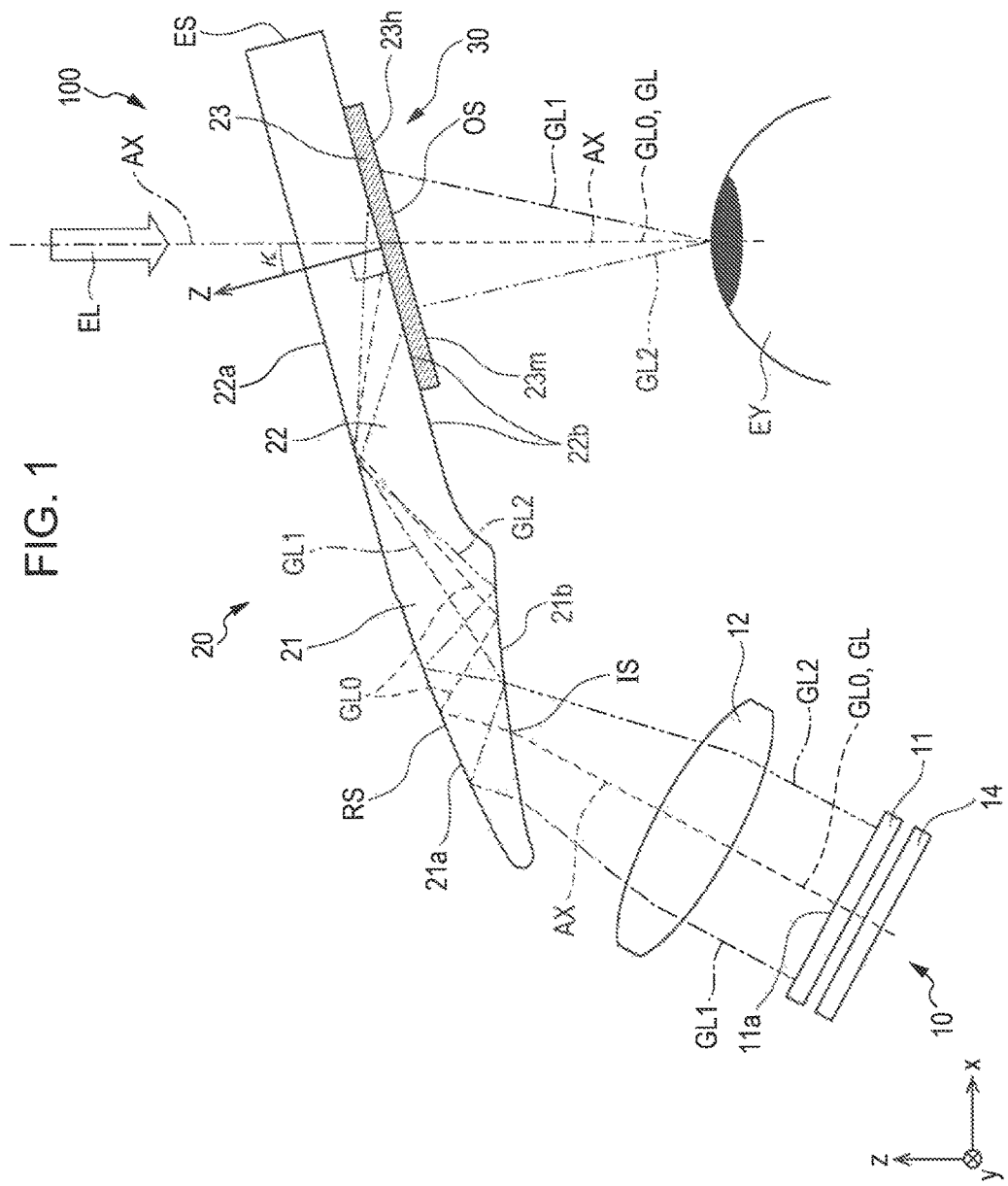
FIG. 1 is a plan view of a display device according to a first embodiment.
Figure 2:
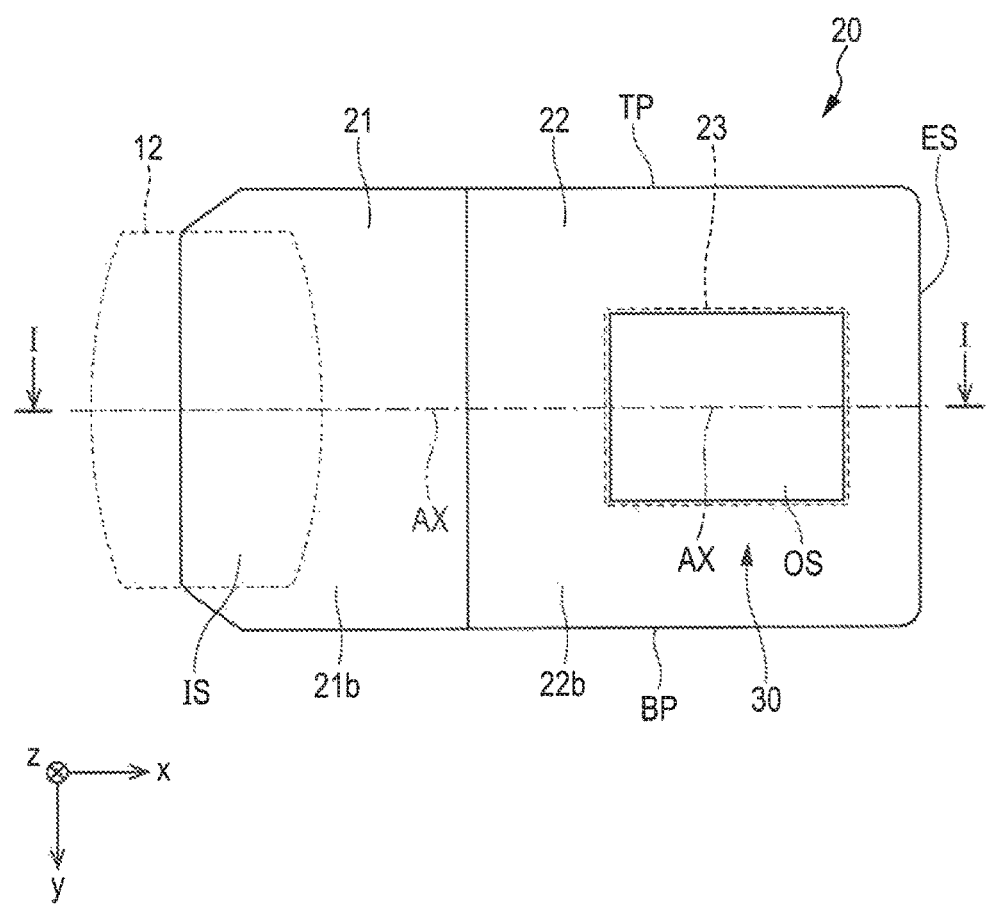
FIG. 2 is a rear view of a light-guiding unit.
Figure 3:
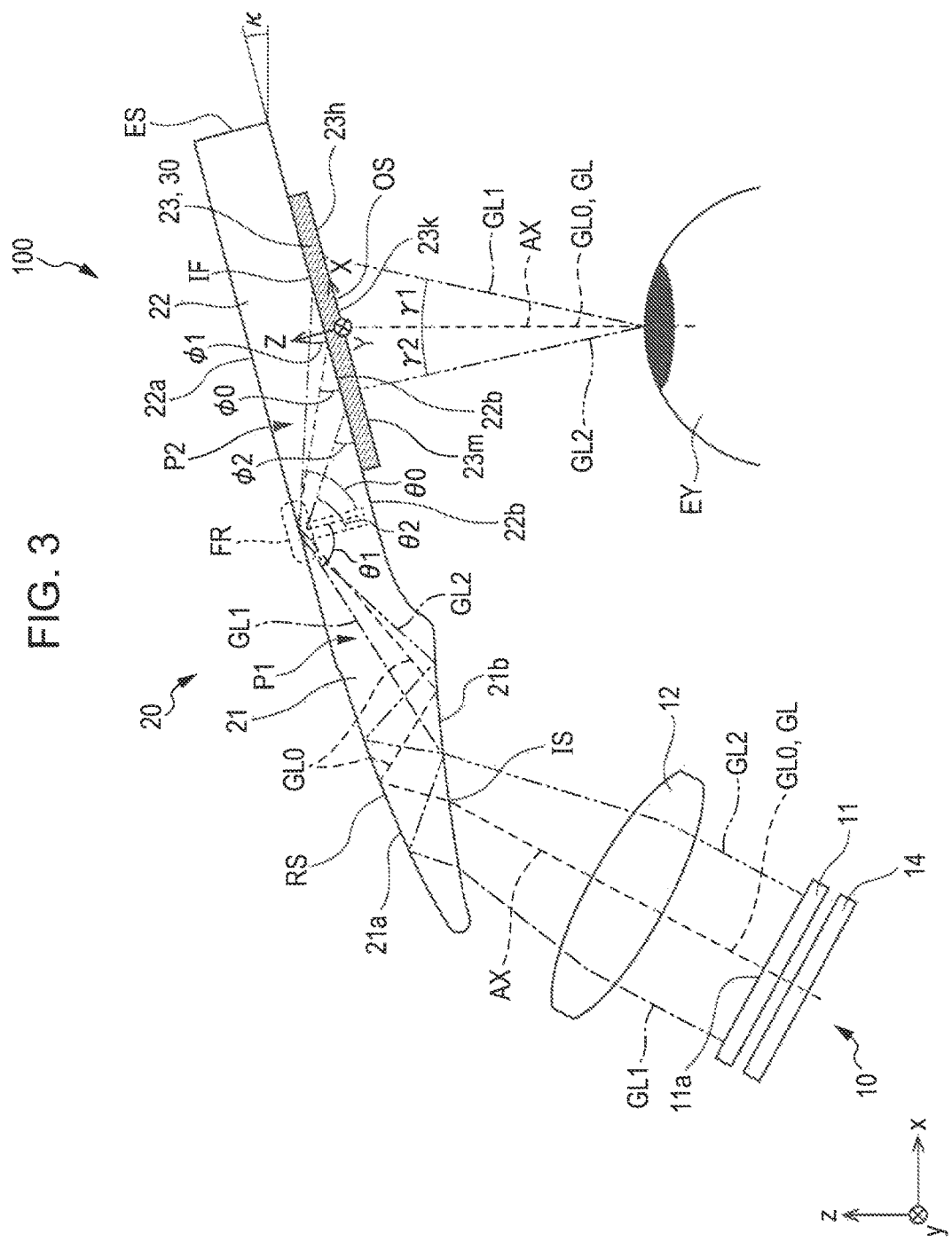
FIG. 3 is a diagram which illustrates an optical path of image light in the light-guiding unit.

FIG. 1 is a plan view of the display device according to the first embodiment. FIG. 2 is a rear view of a light-guiding unit. FIG. 3 is a diagram which illustrates an optical path of image light in the light-guiding unit.

In addition, in the figures, the dimensions of each constituent element differ from actual dimensions in order to make each constituent element easy to view.

Overall Configuration of Light-Guiding Unit and Display Device

As illustrated in FIG. 1, a display device 100 includes an image display unit 10 and a light-guiding unit 20. FIG. 1 corresponds to section I-I of the light-guiding unit 20 illustrated in FIG. 2.

The display device 100 causes an observer to visually recognize an image which is a virtual image and to see through an external image. In the display device 100, a set consisting of the image display unit 10 and the light-guiding unit 20 is provided and corresponds to the left eye and the right eye of an observer; however, since units for the left eye and right eye are symmetrical, the units for the left eye are illustrated, and the units for the right eye are not illustrated. As a whole, the display device 100 has an appearance (not illustrated) resembling spectacles, for example.

The image display unit 10 includes a liquid crystal panel 11 and a projector lens 12. The liquid crystal panel 11 spatially modulates illumination light from a light source 14 and forms image light GL which is to be a display target in addition to a moving image. The projector lens 12 is a collimator lens which forms the image light GL output from each point on the liquid crystal panel 11 into an approximately parallel light beam. The projector lens 12 is formed of glass or plastic and may be formed of a plurality of lenses, without being limited to one lens. The projector lens 12 is not limited to a spherical lens, and an aspherical lens, a lens with a free curved surface, or the like may be used.

The light-guiding unit 20 includes a flat plate-shaped light transmitting member. The light-guiding unit 20 transmits external light EL which forms an external image, while outputting, toward an eye EY of an observer, the image light GL which is formed as virtual image light in the image display unit 10. The light-guiding unit 20 includes an input unit 21 into which image light enters, a parallel light-guiding body 22 which mainly guides the image light, and an output unit 23 for outputting the image light GL and the external light EL. The parallel light-guiding body 22 and the input unit 21 are integrally formed by using a resin material with high light-transmittance properties. In the first embodiment, an optical path of the image light GL which is caused to be propagated to the light-guiding unit 20 is formed of an optical path of a type in which reflection is performed the same number of times, and is not a combination of a plurality of types of optical paths.

The parallel light-guiding body 22 is disposed so as to be inclined with respect to an optical axis AX based on an eye EY of an observer. A normal line direction Z of a plane 22a of the parallel light-guiding body 22 is inclined with respect to the optical axis AX at an angle κ. In this manner, it is possible to dispose the parallel light-guiding body 22 in front of the observer's face, and a line normal to the plane 22a of the parallel light-guiding body 22 is inclined with respect to the optical axis AX. In this manner, in a case of causing the line normal to the plane 22a of the parallel light-guiding body 22 to be inclined with respect to an x direction which is parallel to the optical axis AX at the angle κ, image light GL0 on and about the optical axis AX, which is output from an optical element 30 forms the angle κ with a line normal to the light emission plane OS.

The input unit 21 includes a light incident plane IS into which the image light GL from the image display unit 10 enters the interior of the input unit 21, and a reflecting face RS which guides the image light GL toward the parallel light-guiding body 22 by reflecting the image light GL. The light incident plane IS is formed of a recessed curved face 21b on the projector lens 12 side. The curved face 21b also has a function of causing all of the image light GL reflected by the reflecting face RS to be reflected by the inner face side.

The reflecting face RS is formed of a recessed curved face 21a on the projector lens 12 side. The reflecting face RS is formed of a metal film such as an aluminum film which is formed on the curved face 21a by a vapor deposition method or the like. The reflecting face RS changes the direction of an optical path of the image light GL from the light incident plane IS by reflecting the image light GL. The curved face 21b changes the direction of an optical path of the image light GL reflected by the reflecting face RS by reflecting all of the image light GL in the inside. In this manner, the input unit 21 reliably guides the image light GL to the inside of the parallel light-guiding body 22 by causing the image light GL from the incident plane IS to be reflected twice and by changing the direction of the optical path thereof.

The parallel light-guiding body 22 is a flat plate-shaped light-guiding member which is parallel to a y-axis and inclined with respect to a z-axis, and the parallel light-guiding body 22 is also referred to as a light-guiding body. The parallel light-guiding body (light-guiding body) 22 is formed of a resin material with light-transmittance properties or the like and includes a pair of planes 22a and 22b which are approximately parallel to each other. Since the planes 22a and 22b are parallel to each other, there is no case of an external image being enlarged or out of focus. The plane 22a functions as a total reflecting face that enables all of the image light from the input unit 21 to be reflected and plays a role of guiding the image light GL to the output unit 23 with little loss. The plane 22a is disposed on the external side of the parallel light-guiding body 22, functions as a first total reflecting face, and is also referred to as a face on the external side in the specification.

The plane 22b is also referred to as a face on the observer side in the specification. The plane (face on observer side) 22b extends to one end of the output unit 23. Here, the plane 22b is an interface IF between the parallel light-guiding body 22 and the output unit 23 (refer to FIG. 3).

In the parallel light-guiding body 22, all of the image light GL reflected by the reflecting face RS or the light incident plane IS of the input unit 21 is input to the plane 22a as a total reflection face, is reflected by the plane 22a, and is guided to a depth side of the light-guiding unit 20, that is, a +x side on which the output unit 23 is provided, or the X side. As illustrated in FIG. 2, in an external shape of the light-guiding unit 20, the parallel light-guiding body 22 includes a terminal face ES as an end face on the +x side. In addition, the parallel light-guiding body 22 includes an upper end face TP and a lower end face BP as end faces on the ±y side.

As illustrated in FIG. 3, the output unit 23 is formed in a plate shape along the plane 22b or the interface IF, on the depth side (+x side) of the parallel light-guiding body 22. The output unit 23 changes the direction of the input image light GL to a light emission plane OS side by reflecting the image light GL which is input at a predetermined angle, when causing all of the image light GL to be reflected by a region FR of the plane (total reflection face) 22a on the external side of the parallel light-guiding body 22 to pass through. Here, the image light GL which is firstly input to the output unit 23 without passing through the output unit is a target to be taken out as virtual image light. That is, even when there is light reflected by the inner face of the light emission plane OS in the output unit 23, the light is not used as image light.

The output unit 23 includes the optical element 30 which is obtained by arranging a plurality of partially reflecting surfaces with light-transmittance properties. A structure of the optical element 30 will be described in detail later with reference to FIG. 4, or the like. The optical element 30 is formed along the plane 22b on the observer side of the parallel light-guiding body 22.

Since the light-guiding unit 20 has the above-described structure, the image light GL output from the image display unit 10, and input to the light-guiding unit 20 from the light incident plane IS is bent due to reflecting of a plurality of times in the input unit 21, and all of the image light GL proceeds along the optical axis AX by being reflected by the region FR of the plane 22a of the parallel light-guiding body 22. The image light GL reflected by the region FR of the plane 22a on the +z side is input to the output unit 23.

At this time, in a xy plane, a width of the region FR in the longitudinal direction is smaller than that of the output unit 23 in the longitudinal direction. That is, an input width of a light flux of the image light GL which is input to the output unit 23 (or, optical element 30) is larger than that of a light flux of the image light GL which is input to the region FR. Due to this, an interference of an optical path rarely occurs, and it is easy to cause the image light GL from the region FR to be directly input to the output unit 23 (or, optical element 30) without using the interface IF in light-guiding, that is, without causing the image light GL to be reflected by the interface IF, by setting the input width of the light flux of the image light GL which is input to the region FR to be relatively small.

The image light GL input to the output unit 23 enters a state of being taken out by being bent at an appropriate angle in the output unit 23, and is finally output from the light emission plane OS. The image light GL output from the light emission plane OS is input to an eye EY of an observer as a virtual image light. When the virtual image light is formed as an image in the retina of the observer, the observer is able to recognize the image light GL using a virtual image.

Here, an input angle of the image light GL which is used when forming an image with respect to the output unit 23 becomes large when being separated from the input unit 21 on the light source side. That is, image light GL which is greatly inclined toward the Z direction which is parallel to the plane 22a on the external side, or to the optical axis AX is input, and is bent at a relatively large angle on the depth side of the output unit 23, and image light GL which is slightly inclined toward the Z direction, or the optical axis AX is input, and is bent at a relatively small angle on the front side of the output unit 23.

Optical Path of Image Light

Hereinafter, an optical path of image light will be described in detail.

As illustrated in FIG. 3, in image light beams which are respectively output from an emission plane 11a of a liquid crystal panel 11, a component output from a center portion of the emission plane 11a which is denoted by a dashed line is set to image light GL0, a component which is output from a left side on a paper face (−x side and +z side) in the periphery of the emission plane 11a denoted by one-dot dashed line is set to image light GL1, and a component output from a right side on a paper face (+x side and −z side) in the periphery of the emission plane 11a denoted by two-dot dashed line is set to image light GL2. Among these, an optical path of the image light GL0 extends along the optical axis AX.

Main components of the image light beams GL0, GL1, and GL2 which pass through the projector lens 12 reach the output unit 23 by passing through the inside of the parallel light-guiding body 22 via the input unit 21, after being input from the light incident plane IS of the light-guiding unit 20, respectively.

Specifically, among the image light beams GL0, GL1, and GL2, the image light GL0 which is output from the center portion of the emission plane 11a is combined in the parallel light-guiding body 22 by being bent in the input unit 21, is input to the region FR of the plane 22a on one side at a standard reflection angle θ0, all of the image light GL0 is reflected thereafter, passes through the interface IF without being reflected by the interface IF between the parallel light-guiding body 22 and the output unit 23 (or, optical element 30), and is directly input to a center portion 23k of the output unit 23. The image light GL0 is reflected by the portion 23k at a predetermined angle, and is output as a parallel light flux in the optical axis AX direction (direction of angle κ with respect to Z direction) which is inclined with respect to an XY plane including the light emission plane OS, from the light emission plane OS.

All of the image light GL1 which is output from one end side (−x side) of the emission plane 11a is reflected by being input to the region FR of the plane 22a at a maximum reflection angle θ1, after being combined in the parallel light-guiding body 22 by being bent in the input unit 21, passes through the interface IF without being reflected by the interface IF between the parallel light-guiding body 22 and the output unit 23 (or, optical element 30), is reflected by a portion 23h on the depth side (+x side) in the output unit 23 at a predetermined angle, and is output as a parallel light flux toward a predetermined angle direction from the light emission plane OS. In an output angle γ1 at this time, the angle when being returned to the input unit 21 side becomes relatively large.

Meanwhile, all of the image light GL2 which is output from the other end side (+x side) of the emission plane 11a is reflected by being input to the region FR of the plane 22a at a minimum reflection angle θ2, after being combined in the parallel light-guiding body 22 by being bent in the input unit 21, passes through the interface IF without being reflected by the interface IF between the parallel light-guiding body 22 and the output unit 23 (or, optical element 30), is reflected by a portion 23m on an entrance side (−x side) in the output unit 23 at a predetermined angle, and is output as a parallel light flux toward a predetermined angle direction from the light emission plane OS. In an output angle γ2 at this time, the angle when being returned to the input unit 21 side becomes relatively small.

The image light beams GL0, GL1, and GL2 are described by representing a part of the entire light beam of the image light GL; however, light beam components which configure another image light GL are guided similarly to the image light GL0, and the like, and are output from the light emission plane OS. For this reason, illustrations and descriptions thereof are omitted.

Here, as an example of a value of a refractive index n of a transparent resin material which is used in the input unit 21 and the parallel light-guiding body 22, when setting n to 1.4, a value of a critical angle θc becomes θc≈45.6°. By setting a minimum reflection angle θ2 in reflection angles θ0, θ1, and θ2 of the image light beams GL0, GL1, and GL2 to a value larger than the critical angle θc, it is possible to satisfy a total reflection condition with respect to necessary image light.

The image light GL0 in the center portion is input to the portion 23k of the output unit 23 at an elevation angle of φ0 (=90°−θ0). The image light GL1 at the periphery is input to the portion 23h of the output unit 23 at an elevation angle of φ1 (=90°−θ1). The image light GL2 at the periphery is input to the portion 23m of the output unit 23 at an elevation angle of φ2 (=90°−θ2). Here, a relationship of φ2>φ0>φ1 is satisfied between the elevation angles φ0, φ1, and φ2 by reflecting a relationship in size in the reflection angles θ0, θ1, and θ2. That is, an input angle ι (refer to FIG. 4) to the partially reflecting surface 31 of the optical element 30 becomes gradually small in order of the portion 23m corresponding to the elevation angle φ2, the portion 23k corresponding to the elevation angle φ0, and the portion 23h corresponding the elevation angle φ1. In other words, the input angle ι to the partially reflecting surface 31, or a reflection angle in the partially reflecting surface 31 becomes small when being separated from the input unit 21.

An overall behavior of a light flux of the image light GL which is reflected by the plane 22a on the external side of the parallel light-guiding body 22, and goes toward the output unit 23 will be described.

As illustrated in FIG. 3, a width of the light flux of the image light GL is narrowed in any one of rectilinear optical paths of P1 and P2 before and after being reflected by the region FR on the external side of the parallel light-guiding body 22, in a section including the optical axis AX. Specifically, an overall width of the light flux of the image light GL is narrowed, and a beam width becomes small at a position in the vicinity of the region FR, that is, a position of straddling the rectilinear optical paths P1 and P2 in the vicinity of a boundary between the rectilinear optical paths P1 and P2, in the section including the optical axis AX. Due to this, it is possible to make a view angle in the horizontal direction relatively wide, easily, by narrowing the light flux of the image light GL near the output unit 23.

In the illustrated example, the beam width of the light flux of the image light GL becomes small by being narrowed at a position at which the light flux straddles the rectilinear optical paths P1 and P2; however, the beam width may be set to be small by being narrowed in any one of rectilinear optical paths P1 and P2.

Configuration of Optical Element

Hereinafter, a configuration of the optical element 30 which configures the output unit 23 will be described with reference to FIGS. 3 to 5.

The output unit 23 is formed of the optical element 30 which is provided on a viewing side of the parallel light-guiding body 22. Accordingly, the output unit 23 is provided along the XY plane which is inclined with respect to the optical axis AX at the angle κ, similarly to the parallel light-guiding body 22. The optical element 30 includes a plurality of the partially reflecting surfaces 31, and a plurality of light transmitting members 32. The optical element 30 has a configuration in which the plurality of light transmitting members 32 interpose the partially reflecting surface 31 between two light transmitting members 32 which are adjacent to each other, respectively. In other words, the optical element 30 has a configuration in which the partially reflecting surface 31 and the light transmitting member 32 are alternately disposed.

Figure 5:
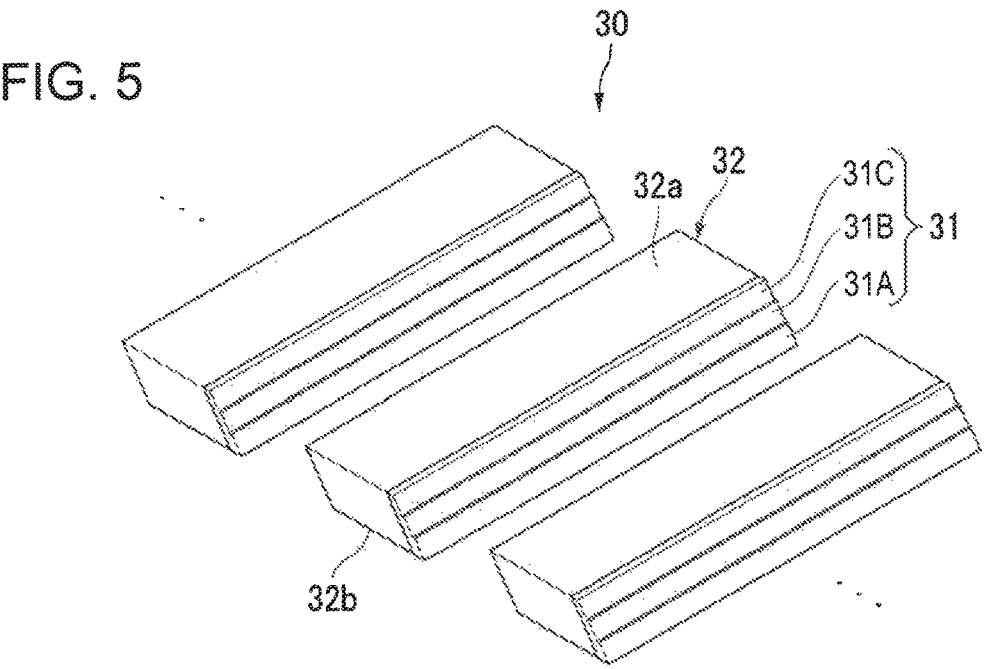
FIG. 5 is an exploded perspective view of the optical element.

FIG. 5 is a perspective view which illustrates a state in which a pair of light transmitting members 32 and the partially reflecting surface 31 are exploded in sets in the optical element 30.

As illustrated in FIG. 5, the light transmitting member 32 is a columnar member of which a sectional shape which is perpendicular to the longitudinal direction is a parallelogram. Accordingly, the light transmitting member 32 has two pair of planes which extend in the longitudinal direction, and are parallel to each other. In these two pair of planes, one plane in one set is an incident plane 32a to which the image light GL and the external light EL are input, and the other plane in the one set is an emission plane 32b from which the image light GL and the external light EL are output. In addition, the partially reflecting surface 31 including regions 31A, 31B, and 31C of which film thicknesses are different are provided on one plane in the other set. The light transmitting member 32 is formed of, for example, glass, a transparent resin, or the like.

All of the plurality of light transmitting members 32 are formed so as to have the same shape and the same dimension. For this reason, when bonding a plurality of sets of a pair of light transmitting members 32 and the partially reflecting surface 31, the plurality of partially reflecting surfaces 31 are formed in a shape of being disposed in parallel to each other. Though illustrations thereof are omitted in FIGS. 4 and 5, an adhesive layer is provided between on one face of the partially reflecting surface 31 and the light transmitting members 32 which are adjacent to each other. In this manner, the optical element 30 becomes a rectangular plate-shaped member as a whole. When viewing the optical element 30 in a normal line direction of the incident plane 32a or the emission plane 32b of the light transmitting member 32, it has a structure in which the plurality of partially reflecting surfaces 31 with a thin belt shape are aligned in a stripe shape. That is, the optical element 30 has a configuration in which the plurality of rectangular-shaped partially reflecting surfaces 31 are arranged in a direction in which the parallel light-guiding body 22 extends, that is, in the X direction at predetermined intervals (pitch PT).

Figure 4:
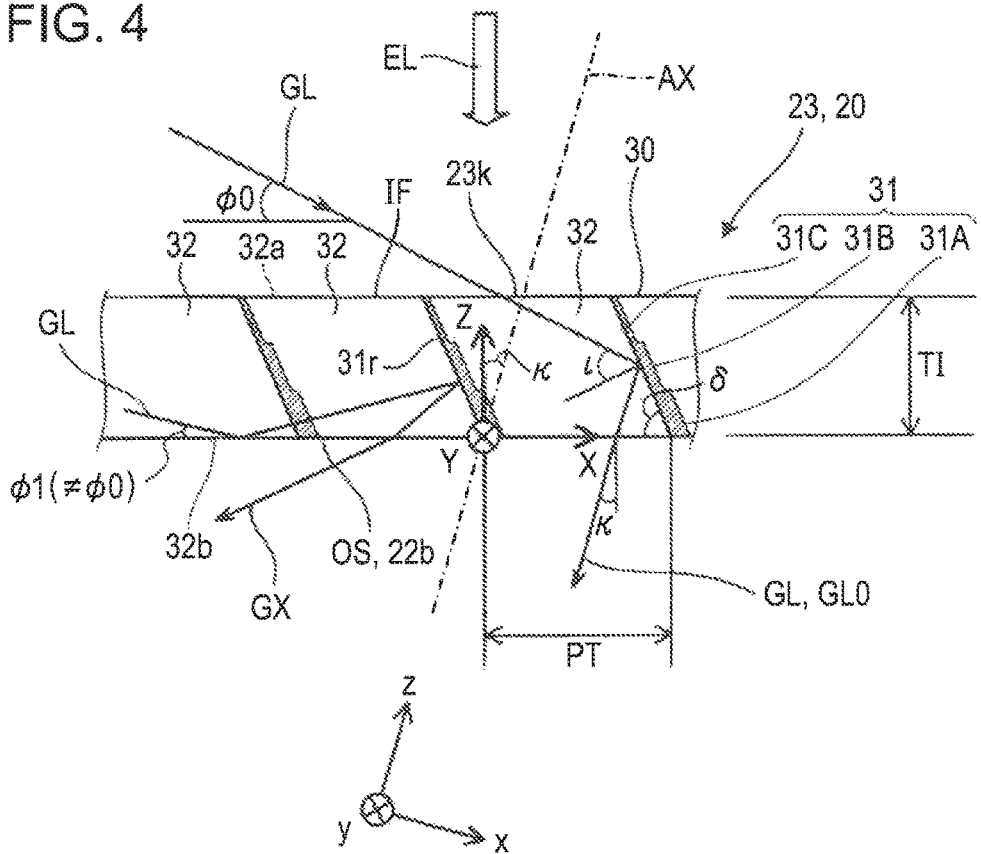
FIG. 4 is an enlarged view of an optical element according to the first embodiment.

As illustrated in FIG. 4, since one face of the partially reflecting surface 31 is a flat face, and the other face is a face with a step of a film thickness, strictly speaking, partially reflecting surfaces 31 which are adjacent to each other are not parallel. However, in the embodiment, when at least one face of the partially reflecting surface is parallel, it is assumed that the plurality of partially reflecting surfaces are parallel to each other. Since the partially reflecting surface is formed of a thin film, and a difference in film thickness is small, it is allowable to assume that the plurality of partially reflecting surfaces are parallel to each other, when neglecting the difference in film thickness.

The partially reflecting surface 31 is formed of a reflective film which is interposed between the light transmitting members 32. A metal film with a high reflectance such as aluminum, for example, is used as the reflective film. Since a thickness of the reflective film is sufficiently thin, the partially reflecting surface 31 enables a portion of the image light GL and the external light EL which are input to the optical element 30 to be reflected, and enables another portion of the image light GL and the external light EL to be transmitted. As the reflective film, a dielectric multilayer film in which a plurality of dielectric thin films with a different refractive index are alternately layered may be used.

The partially reflecting surface 31 is provided so that a short side thereof is inclined with respect to the incident plane 32a and the emission plane 32b of the light transmitting member. More specifically, the partially reflecting surface 31 is inclined so that a reflecting face 31r faces the input unit 21 side toward the external side of the parallel light-guiding body 22. In other words, the partially reflecting surface 31 is inclined in a direction in which an upper end (+Z side) rotates anticlockwise based on a YZ plane which is orthogonal to planes 22a and 22b, by having a long side (Y direction) of the partially reflecting surface 31 as an axis.

Hereinafter, the angle between the reflecting face 31r of the partially reflecting surface 31 and the emission plane 32b of the light transmitting member 32 is defined as an inclination angle δ of the partially reflecting surface 31. According to the embodiment, the inclination angle δ of the partially reflecting surface 31 is 45° or more and less than 90°. According to the embodiment, a refractive index of the light transmitting member 32 is equal to that of the parallel light-guiding body 22; however, the refractive indexes may be different. In a case in which the refractive indexes are different, it is necessary to change the inclination angle δ of the partially reflecting surface 31 in the case of the same refractive index.

The partially reflecting surface 31 includes the plurality of regions 31A, 31B, and 31C having different reflectances in the inclination direction. In the example in FIG. 4, a metal film is used as the reflection film, and the partially reflecting surface 31 is formed of a metal film with a plurality of regions of which film thicknesses are different along the inclination direction. A film thickness of a metal film in each of regions 31A, 31B, and 31C is, for example, 10 nm, 20 nm, and 30 nm. In the example, the partially reflecting surface 31 includes three regions 31A, 31B, and 31C having different reflectances; however, the number of regions is not limited to three, and may be two or more. In addition, the partially reflecting surface may be formed so that reflectances become continuously different without regions having reflectances which become gradually different. Also in the case in which reflectances become continuously different, the partially reflecting surface includes a plurality of regions of which film thicknesses are different.

As described above, in a case of using a metal film as the reflection film, it is possible to make reflectances different by making a film thickness different depending on a region. In a case of using a dielectric multilayer film as the reflection film, it is possible to make reflectances different by making any one of a film thickness of one layer of the dielectric multilayer film, the number of layers, and a material of a dielectric substance different depending on regions.

As in the embodiment, in a case in which the inclination angle δ of the partially reflecting surface 31 is 45° or more and less than 90°, a high reflectivity region 31A having a relatively high reflectance is provided on a side near to the emission plane 32b in the inclination direction. A low reflectivity region 31C with a reflectance lower than that of the high reflectivity region 31A is provided on a side far from the emission plane 32b compared with the high reflectivity region 31A in the inclination direction. In addition, an intermediate reflectivity region 31B with a reflectance between the reflectance of the high reflectivity region 31A and the reflectance of the low reflectivity region 31C is provided between the high reflectivity region 31A and the low reflectivity region 31C. That is, the low reflectivity region 31C, the intermediate reflectivity region 31B, and the high reflectivity region 31A are provided in this order from the incident plane 32a toward the emission plane 32b.

A pitch PT of the partially reflecting surface 31 in the optical element 30 is set to approximately 0.5 mm to 2.0 mm. In addition, as illustrated in FIG. 4, a pitch of the partially reflecting surface 31 is set to be slightly wide in the optical element 30, and a portion of the external light EL passes through the optical element 30 without being input to the partially reflecting surface 31. In this case, it is possible to avoid a situation in which the external light EL directly passes through the optical element 30, by appropriately adjusting a pitch of the partially reflecting surface 31.

Strictly speaking, the pitch PT of the partially reflecting surface 31 is disposed in a variable pitch, not an equal interval. More specifically, the pitch PT of the partially reflecting surface 31 in the optical element 30 is set to a random pitch which is randomly increased or decreased based on a reference interval. In this manner, by disposing the partially reflecting surface 31 in the optical element 30 at a random pitch, it is possible to suppress an occurrence of irregular diffraction or moire. In addition, it is not limited to a random pitch, and for example, may be a configuration in which a predetermined pitch pattern including a pitch which increase or decreases in a plurality of stages is repeated.

Here, a thickness of the optical element 30, that is, a thickness TI of the partially reflecting surface 31 in a Z axis direction is set to approximately 0.7 mm to 3.0 mm. A thickness of the parallel light-guiding body 22 which supports the optical element 30 is set to, for example, approximately several mm to 10 mm, and approximately 4 mm to 6 mm, preferably. When a thickness of the parallel light-guiding body 22 is sufficiently larger than that of the optical element 30, it is easy to make an input angle of the image light GL to the optical element 30 or the interface IF small, and it is easy to suppress a reflection on the partially reflecting surface 31 which is located at a position in which the image light GL does not enter into the eye EY. Meanwhile, when the thickness of the parallel light-guiding body 22 is set to be relatively small, it is easy to make the parallel light-guiding body 22 or the light-guiding unit 20 lightweight.

Manufacturing Method for Optical Element

Hereinafter, an example of a manufacturing method for the optical element 30 will be described with reference to FIGS. 6A to 6C, 7A and 7B, and 8.

The manufacturing method for the optical element 30 includes a process of manufacturing an element plate, a process of manufacturing a layered body, and a separating (manufacturing optical element) process. The process of manufacturing the element plate is a process in which a partially reflecting surface including a plurality of regions having different reflectances is formed, using a mask, on one face of a light transmitting substrate, and the element plate formed of the light transmitting substrate on which the partially reflecting surface is formed is manufactured. The process of manufacturing a layered body is a process in which the plurality of element plates are layered by causing the partially reflecting surface to face the same direction, and the layered body in which a plurality of the element plates are layered is manufactured. The separating (manufacturing optical element) process is a process of manufacturing a separated optical element by cutting the layered body so that each of the partially reflecting surfaces is inclined with respect to a cutting face, and a plurality of regions in which reflectances of the partially reflecting surfaces are different are disposed along the inclination direction.

Figure 6A:
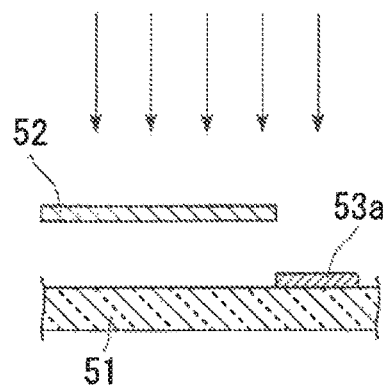
FIG. 6A is a process drawing which describes a first manufacturing method for a partially reflecting surface.

First, as illustrated in FIG. 6A, as a first film forming process, a light transmitting substrate 51 such as a glass plate is prepared, a metal film 53a such as aluminum is formed, for example, with a film thickness of 10 nm on one face of the light transmitting substrate 51, by a vapor deposition method, a sputtering method, or the like, using a mask 52.

Figure 6B:
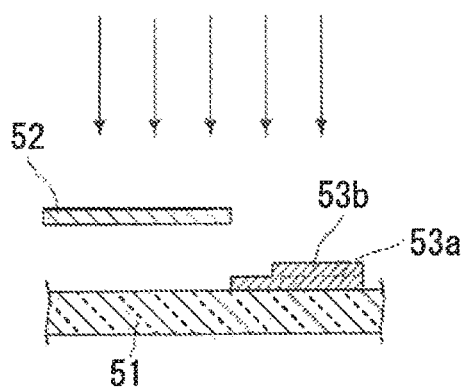
FIG. 6B is a diagram which illustrates a continuous process of the process in FIG. 6A.

Subsequently, as illustrated in FIG. 6B, as a second film forming process, the mask 52 is moved in a direction far from the region in which the metal film 53a is formed in the first film forming process (left direction in figure), and a metal film 53b which is formed by using the same material is formed on one face of the light transmitting substrate 51. At this time, the metal film 53b is further layered on the metal film 53a which was already formed in the first film forming process, along with forming of the metal film 53b on one face of the light transmitting substrate 51 which is newly exposed in the process. For this reason, a metal film with a film thickness of two stages is formed. A difference in film thickness is set to approximately 10 nm, for example.

Figure 6C:
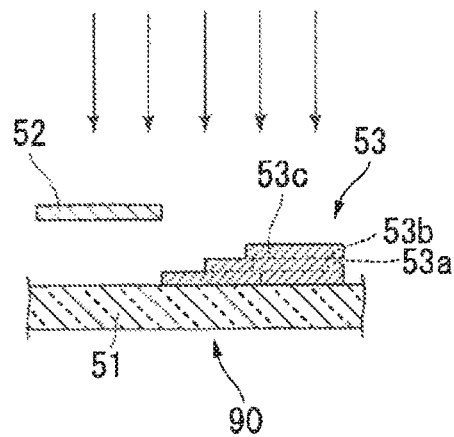
FIG. 6C is a diagram which illustrates a continuous process of the process in FIG. 6B.

Subsequently, as illustrated in FIG. 6C, as a third film forming process, the mask 52 is moved in a direction far from the region in which the metal film 53b is formed in the second film forming process (left direction in figure), and a metal film 53c which is formed of the same material is formed on one face of the light transmitting substrate 51. At this time, the metal film 53c is formed on one face of the light transmitting substrate 51 which is newly exposed in the process, the metal film 53c is further layered on the metal film 53b which is formed in the second film forming process, and the metal film 53c is further layered on the metal films 53a and 53b which are already formed in the first film forming process and the second film forming process. In this manner, an element plate 90 in which the metal film 53 with a film thickness of three stages, that is, with three types of reflectances is formed on the light transmitting substrate 51 is manufactured. A difference in film thickness is set to be approximately 10 nm, for example.

In a case in which a dielectric multilayer film is used as the reflection film, the following method may be adopted.

Figure 7A:
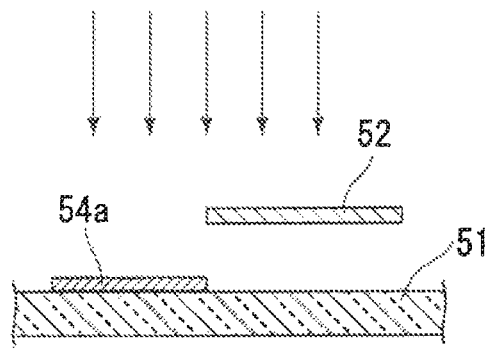
FIG. 7A is a process diagram which describes a second manufacturing method for the partially reflecting surface.

First, as illustrated in FIG. 7A, as a first film forming process, a light transmitting substrate 51 such as a glass plate is prepared, and a dielectric multilayer film 54a is formed on one face of the light transmitting substrate 51, by a vapor deposition method, a sputtering method, or the like, using the mask 52.

Figure 7B:
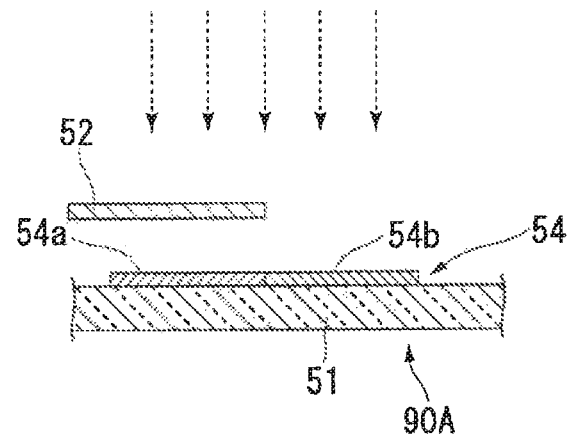
FIG. 7B is a diagram which illustrates a continuous process of the process in FIG. 7A.

Subsequently, as illustrated in FIG. 7B, as a second film forming process, the mask 52 is moved to the region in which the dielectric multilayer film 54a is formed in the first film forming process, and a dielectric multilayer film 54b which is different from that in the first film forming process is formed in a region in which the dielectric multilayer film 54a is not formed in the first film forming process. At this time, any one of a film thickness of one layer of the dielectric multilayer films 54a and 54b, the number of layers, and a material of dielectric substance may be set to be different. In this manner, an element plate 90A in which the dielectric multilayer film 54 including a region with different reflectances is formed on the light transmitting substrate 51 is manufactured.

Figure 8:
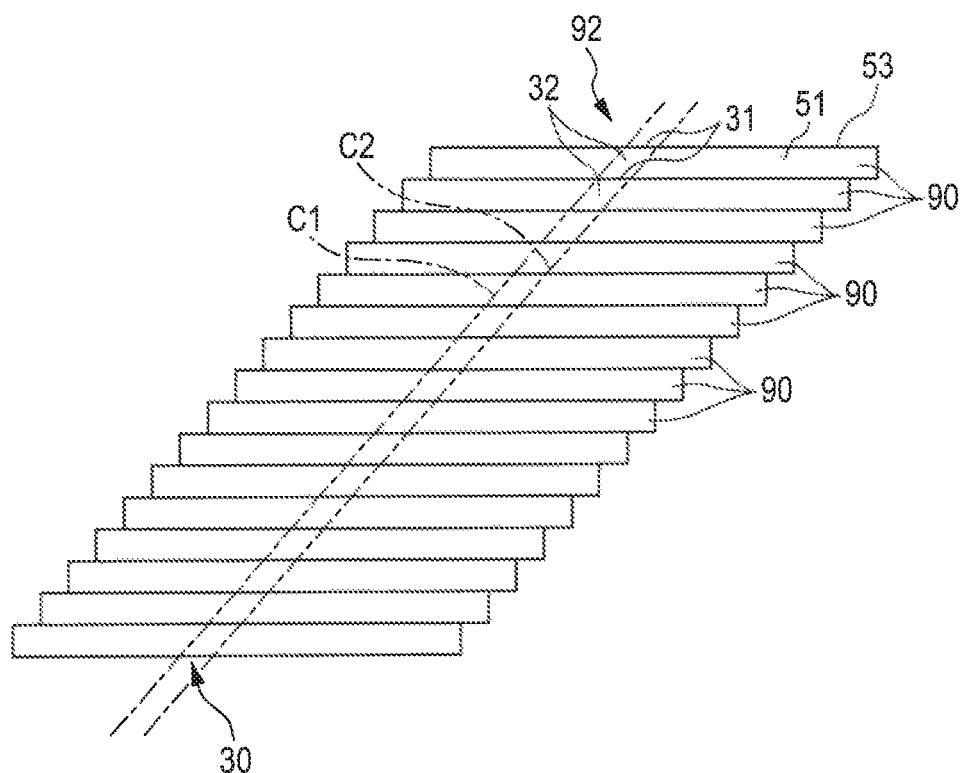
FIG. 8 is a diagram which describes a manufacturing method for an optical element.

Subsequently, as illustrated in FIG. 8, the plurality of element plates 90 are bonded, using an adhesive, and a layered body 92 is manufactured. Thereafter, the layered body 92 is obliquely cut along cutting lines C1 and C2 which are inclined with respect to one face of the element plate 90. In this manner, the layered body 92 is separated, and the optical element 30 with a structure in which the partially reflecting surface 31 is interposed between the light transmitting members 32 formed in a thin and long prism shape is completed.

In addition, when attaching the optical element 30 to the parallel light-guiding body 22, as illustrated in FIG. 3, the optical element 30 is bonded to a predetermined position of the plane 22b on the viewing side of the parallel light-guiding body 22 using an adhesive, and is fixed by curing the adhesive, thereafter.

Operation of Optical Element

As illustrated in FIGS. 3, 4, and the like, the plurality of partially reflecting surfaces 31 have an inclination angle δ of approximately 48° to 70°, for example, and specifically, have an inclination angle δ of 60°, for example. Here, it is assumed that the elevation angle φ0 of the image light GL0 is set to 30°, for example, the elevation angle φ1 of the image light GL1 is set to 22°, for example, and the elevation angle φ2 of the image light GL2 is set to 38°, for example. In this case, the image light GL1 and the image light GL2 are input to the eye EY of an observer at the angle of γ1=γ2≈12.5° based on the optical axis AX.

In this manner, in a case in which a component with a relatively large total reflection angle in the image light GL (image light GL1) is mainly input to the portion 23h side on the −x side in the optical element 30, and a component with a relatively small total reflection angle (image light GL2) is mainly input to the portion 23m side on the +x side in the output unit 23, it is possible to efficiently output the image light GL at the angle in which the image light GL is collected in the eye EY of an observer as a whole. Since the optical element 30 has a configuration of outputting the image light GL in such an angular relationship, the light-guiding unit 20 can cause the image light GL to pass through the optical element 30 only once, without causing the image light to pass through the optical element a plurality of times, in principle. For this reason, the optical element 30 can output the image light GL as a virtual image light with little loss.

A small portion of the image light GL passes through the partially reflecting surface 31 a plurality of times (specifically, passing through including one reflection and penetrating of once or more) in the portion 23k, 23h, or the like, on the center side or the depth side of the optical element 30. In this case, the number of times of passing through the partially reflecting surface 31 becomes a plurality of times; however, since reflected light beams from the plurality of partially reflecting surfaces 31 are input to the eye EY of the observer, respectively, as the image light GL, a loss in light intensity is not much great.

There is a possibility that a component reflected by the rear side of the parallel light-guiding body 22 or an observer side (that is, light emission plane OS, interface IF, or the like) may occur in the image light GL, in the portion 23k, 23h, or the like, on the center side or the depth side of the optical element 30. However, such image light GL is guided to the outside of an optical path as non-use light GX (refer to FIG. 4) which is reflected by the partially reflecting surface 31, and is not input to the eye EY of an observer. In addition, there is a concern that the non-use light which passes through the partially reflecting surface 31 may be input to the parallel plane 22a on the external side again. However, in a case where all of the light being reflected here, much of non-use light can be input to the portion 23h on the depth side of the optical element 30, or a region other than an effective region farther on the depth side, and it is possible to relieve a concern that the non-use light may be input to the eye EY.

Effect of Embodiment: Effect with Respect to Image Light

Hereinafter, a unique effect of the optical element according to will be described.

Figure 9:
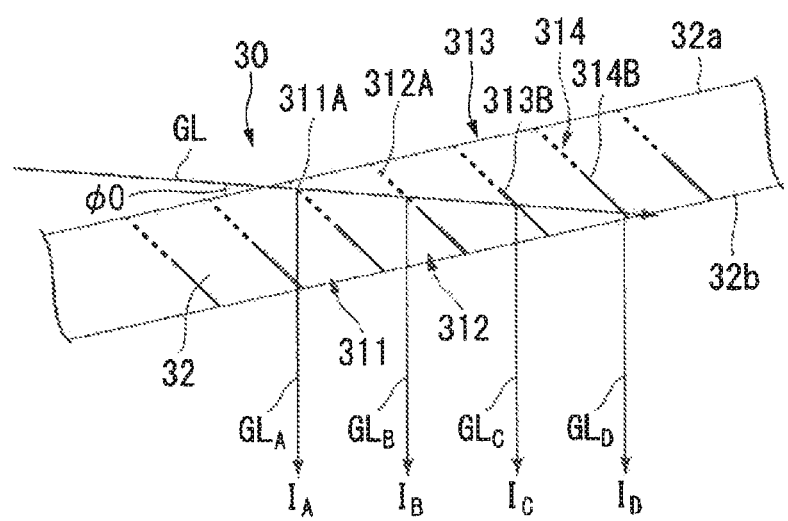
FIG. 9 is a diagram which describes an operation of the optical element according to the first embodiment.

FIG. 9 is a diagram which illustrates a model for describing an operation of the optical element 30 with respect to the image light GL. Here, partially reflecting surfaces 311 to 314 with two regions having different reflectances will be assumed for easy descriptions. An inclination angle δ of the partially reflecting surfaces 311 to 314 is 45° or more and less than 90°.

In the two regions of the partially reflecting surfaces 311 to 314 having different reflectances, a reflectance of a first region (low reflectivity region) on a side far from the emission plane 32b is set to p. In addition, a reflectance of a second region (high reflectivity region) on a side near to the emission plane 32b is set to q.

Image light GL which is input to the incident plane 32a of the optical element 30 at an elevation angle φ0 is taken into consideration.

The image light GL is propagated inside the optical element 30 after being input from the incident plane 32a, and reaches a first partially reflecting surface 311, a second partially reflecting surface 312, a third partially reflecting surface 313, and a fourth partially reflecting surface 314 in this order. A portion of light among light beams which are input to the first partially reflecting surface 311 is reflected by a first region 311A of the first partially reflecting surface 311, of which an optical path is bent, and is output from the emission plane 32b thereafter, and remaining light proceeds toward the second partially reflecting surface 312.

In addition, a portion of light in light beams which pass through the first partially reflecting surface 311 is reflected by a first region 312A of the second partially reflecting surface 312, of which an optical path is bent, and is output from the emission plane 32b thereafter, and remaining light proceeds toward the third partially reflecting surface 313. A portion of light in light beams which pass through the second partially reflecting surface 312 is reflected by a second region 313B of the third partially reflecting surface 313, of which an optical path is bent, and is output from the emission plane 32b thereafter, and remaining light proceeds toward the fourth partially reflecting surface 314. In addition, a portion of light in light beams which pass through the third partially reflecting surface 313 is reflected by a second region 314B of the fourth partially reflecting surface 314, of which an optical path is bent, and is output from the emission plane 32b thereafter.

Here, a relative intensity of light $GL_A$ output from the first partially reflecting surface 311 is set to $I_A$, a relative intensity of light $GL_B$ output from the second partially reflecting surface 312 is set to $I_B$, a relative intensity of light $GL_C$ output from the third partially reflecting surface 313 is set to $I_C$, and a relative intensity of light $GL_D$ output from the fourth partially reflecting surface 314 is set to $I_D$. In addition, the intensity of each of output light beams $GL_A$, $GL_B$, $GL_C$, and $GL_D$, when setting the intensity of the image light GL which is input to the optical element 30 is set to 1, are defined as a relative intensity.

The relative intensities $I_A$ to $I_D$ are expressed in the following expressions (1) to (4), respectively.

$$\text{relative intensity } I_A: I_A = p \quad (1)$$

$$\text{relative intensity } I_B: I_B = (1-p) \times p \quad (2)$$

$$\text{relative intensity } I_C: I_C = (1-p) \times (1-p) \times q \quad (3)$$

$$\text{relative intensity } I_D: I_D = (1-p) \times (1-p) \times (1-q) \times q \quad (4)$$

As an example of an example, partially reflecting surfaces having a reflectance of p, and a reflectance of q are respectively 0.22 and 0.28 assumed. In addition, as a comparison example, a partially reflecting surface with p=q=0.25 is assumed. That is, the comparison example is a partially reflecting surface having the same reflectances. The relative intensities $I_A$ to $I_D$ of each output light are calculated, by substituting these values of reflectivity to the expressions (1) to (4). A result thereof is illustrated in FIG. 10.

Figure 10:
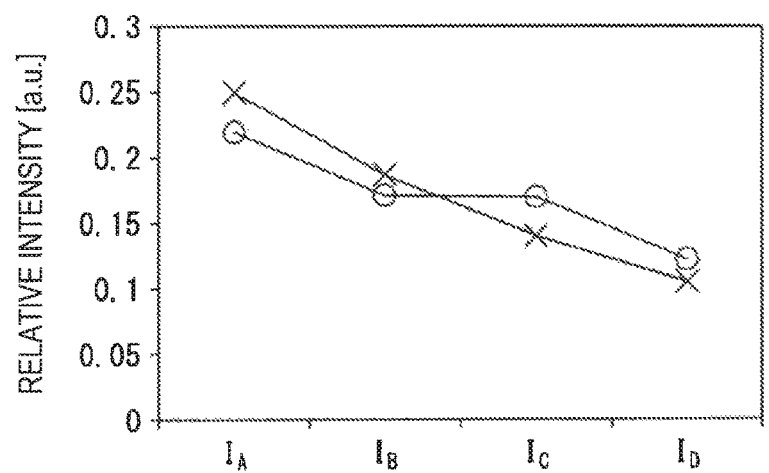
FIG. 10 is a diagram which illustrates a relative intensity of image light output from a plurality of partially reflecting surfaces.

In FIG. 10, points denoted by a mark ○ are the relative intensities $I_A$ to $I_D$ of each output light in the example. In addition, points denoted by a mark x are the relative intensities $I_A$ to $I_D$ of each output light in the comparison example. As illustrated in FIG. 10, in a case of the comparison example, a difference between a maximum value and a minimum value of the relative intensities $I_A$ to $I_D$ is approximately 0.14, and in contrast to this, in a case of the example, a difference between a maximum value and a minimum value of the relative intensities $I_A$ to $I_D$ is approximately 0.10. In this way, it is understood that a difference in the relative intensities $I_A$ to $I_D$ can be reduced compared with a case of uniform reflectances, when setting a reflectance in a region on the side far from the emission plane (observer) relatively small, and setting a reflectance in a region on the side near to the emission plane relatively large.

Here, for simple descriptions, the case of the partially reflecting surfaces 311 to 314 including two regions having different reflectances has been exemplified, and it is also possible to obtain the same result in a case in which the number of regions having different reflectances is three or more. As in the embodiment, it is possible to realize the display device 100 in which striped patterns are not displayed, easily, even when eyes move, using the optical element 30 which includes the partially reflecting surface 31 including two or more regions having different reflectances.

Even when reflectances are uniform, a difference in relative intensity becomes small when setting a value of reflectivity to be small as a whole. However, since a total of relative intensity becomes small in such a case, it is disadvantageous in that use efficiency of image light GL decreases, and an image becomes dark. For example, in a case of setting p=q=0.20 in the above-described example, a difference between the maximum value and the minimum value of the relative intensities $I_A$ to $I_D$ is approximately the same as that in the example; however, a total of the relative intensities $I_A$ to $I_D$ becomes approximately 0.59. Meanwhile, in a case of the example, a total of the relative intensities $I_A$ to $I_D$ is approximately 0.68. Accordingly, it is preferable to use the partially reflecting surface in the example in order to obtain a bright image.

Figure 11:
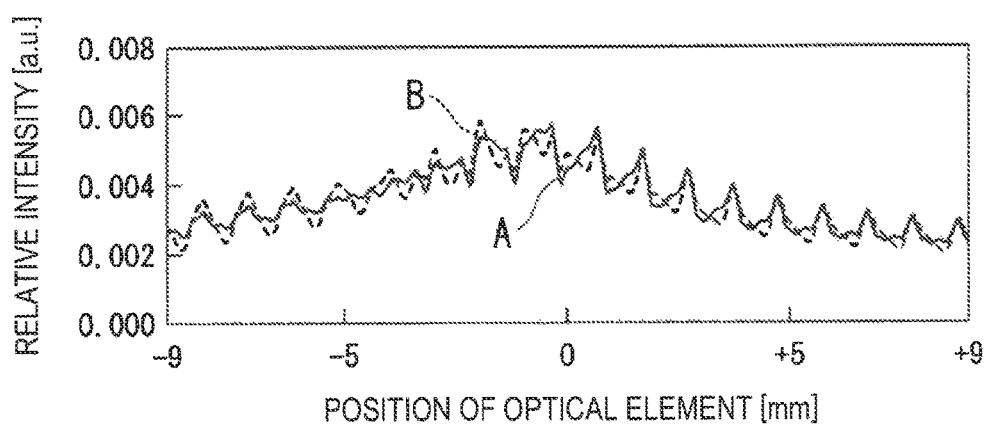
FIG. 11 is a graph which denotes a simulation result of the relative intensity of the image light output from the plurality of partially reflecting surfaces.

A result which is obtained by performing a detailed simulation with respect to the entire optical element 30 is illustrated in FIG. 11. A horizontal axis in FIG. 11 denotes a position (mm) of an optical element, and a vertical axis in FIG. 11 denotes a relative intensity (a. u.). In a position of the optical element 30, a center in the longitudinal direction is set to 0 (mm), a position at an end portion on a side near to the input unit is set to −9 (mm), and a position of an end portion on a side opposite to the input unit is set to +9 (mm).

In FIG. 11, a graph of a solid line denoted by a mark A denotes distribution of a relative intensity in the example, and a graph of a dashed line denoted by a mark B denotes distribution of a relative intensity in the comparison example.

As illustrated in FIG. 11, in a case of the example in which regions having different reflectances are provided, it is understood that a difference in highs and lows of a relative intensity becomes small compared with the comparison example in which reflectances are uniform. In the optical element 30, particularly, an effect on the side near to the input unit 21 is remarkable.

Effect of Embodiment: Effect with Respect to External Light

Figure 12:
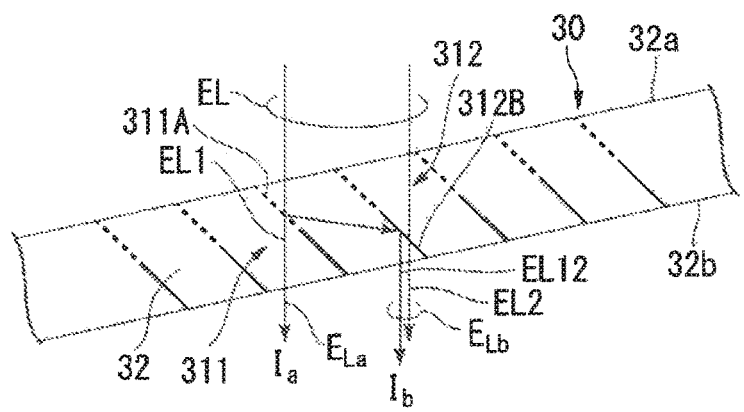
FIG. 12 is a diagram which describes another operation of the optical element according to the first embodiment.

FIG. 12 is a diagram which illustrates a model for describing an operation of the optical element 30 with respect to the external light EL. Here, for easy descriptions, partially reflecting surfaces 311 and 312 with two regions having different reflectances are assumed. An inclination angle δ of the partially reflecting surfaces 311 and 312 is 45° or more and less than 90°.

In two regions of the partially reflecting surfaces 311 and 312 having different reflectances, a reflectance of a first region on a side far from the emission plane is set to p, and a reflectance of a second region on a side near to the emission plane is set to q.

The external light EL is input to the incident plane 32a of the optical element 30 at the angle which is almost perpendicular, differently from the image light GL. In addition, as light input to pupils of an observer, two light beams of light EL1 which passes through the first partially reflecting surface 311, and light EL12 which is reflected once by the first partially reflecting surface 311 are taken into consideration.

A portion of light in the light EL1 is input to the first partially reflecting surface 311 after being input from the incident plane 32a. A portion of light ELa in light input to the first partially reflecting surface 311 passes through the first region 311A of the first partially reflecting surface 311, and is output from the emission plane 32b. Other light beams are reflected by the first region 311A of the first partially reflecting surface 311, and proceed to the second region 312B of the second partially reflecting surface 312.

The light EL12 reflected by the first region 311A of the first partially reflecting surface 311 is reflected by the second region 312B of the second partially reflecting surface 312. In addition, light EL2 which is directly input to the second partially reflecting surface 312 also reaches a reflection position of the second partially reflecting surface 312. For this reason, both of the light EL12 which is reflected by the first region 311A of the first partially reflecting surface 311, and is further reflected by the second region 312B of the second partially reflecting surface 312 and the light EL2 which is directly input to the second region 312B of the second partially reflecting surface 312, and passes through thereof are output from the reflection position of the second partially reflecting surface 312. An observer views light ELb in which the light beams EL12 and EL2 are composited.

Here, a relative intensity of light ELa which is output from the first partially reflecting surface 311 is set to $I_a$, and a relative intensity of the light ELb which is output from the second partially reflecting surface 312 is set to $I_b$.

The relative intensities $I_a$ and $I_b$ are denoted by the following expressions (5) and (6), respectively.

$$\text{relative intensity } I_a : I_a = 1-p \qquad (5)$$

$$\text{relative intensity } I_b : I_b = (1-q) + p \times q \qquad (6)$$

In a case in which a difference between the relative intensities $I_a$ and $I_b$ of the two light beams is large, stripe patterns with delicate light and shade, and diffraction of light occurs. As a result, a problem in which an external image becomes blurry occurs. Accordingly, it is necessary to set a difference between the relative intensities $I_a$ and $I_b$ to be small, in order for an observer to visually recognize a clear external image.

Figure 13:
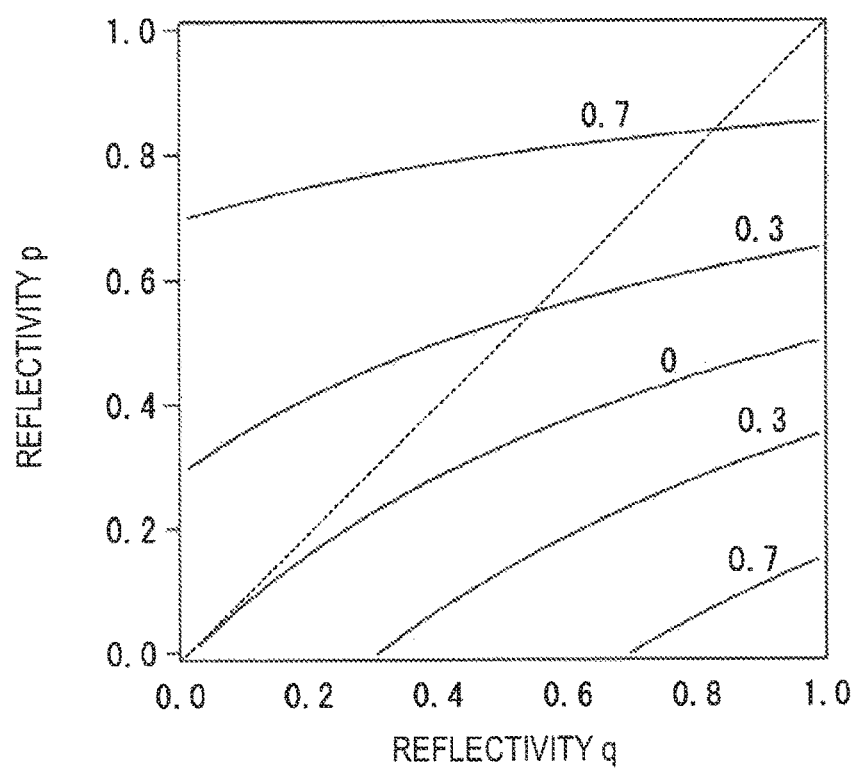
FIG. 13 is a graph which denotes a simulation result of a difference in relative intensity when a reflectance in two regions is changed.

FIG. 13 is a diagram which illustrates a difference between the relative intensities $I_a$ and $I_b$ when changing the reflectance p and the reflectance q to various values. A horizontal axis in FIG. 13 denotes the reflectance q, and a vertical axis in FIG. 13 denotes the reflectance p. In FIG. 13, five curves when setting a difference in relative intensity to 0, ±0.3, and ±0.7 are illustrated.

As illustrated in FIG. 13, in a case in which a relationship in size between the reflectance p and the reflectance q satisfies p<q, it is understood that an absolute value of a difference in relative intensity becomes small. That is, it is possible to set the difference in relative intensity to be small, by setting a reflectance in a region on a side far from the emission plane 32b (observer) of the optical element 30 to be relatively small, and setting a reflectance in a region on a side near to the emission plane 32b to be relatively large. In this manner, it is possible to suppress the external image from being blurry.

Conclusion of Effect of Embodiment

As described above, in the optical element 30 according to the embodiment, each of the plurality of partially reflecting surfaces 31 has the plurality of regions 31A, 31B, and 31C having different reflectances in the inclination direction, the low reflectivity region 31C is provided on the side far from the emission plane (observer) of the optical element 30, and the high reflectivity region 31A is provided on the side near to the emission plane. In this manner, it is possible to obtain two effects of reducing striped patterns resulting from the image light, and suppressing external image from being blurry. Accordingly, in the display device 100 according to the embodiment, it is possible to obtain a high display quality, and excellent see-through properties by being provided with the optical element 30.

In the first embodiment, the parallel light-guiding body 22 is inclined with respect to the xy plane which is perpendicular to the optical axis AX which passes eyes; however, the parallel light-guiding body 22 may be disposed in parallel to the xy plane. In addition, the input unit 21 is formed of curved faces 21a and 21b; however, it is also possible to configure one or both of the faces using a plane. In this case, it is possible to set a portion corresponding to the curved face 21b to a plane in which the plane 22b of the parallel light-guiding body 22 is extended. It is also possible to have a configuration in which the image light GL input from the light incident plane IS is combined in the parallel light-guiding body 22 as is, without causing the light to be reflected by the inner face in the input unit 21.

The parallel light-guiding body 22 is not limited to a completely parallel flat plate, and can be set to a flat plate with a slight curve or a wedge angle. That is, it is possible to set the planes 22a and 22b of the parallel light-guiding body 22 to an aspherical face, a curved face other than that, or cause the planes to form an inclination angle each other. However, in a case in which the planes 22a and 22b are curved, since there is a change in diopter or magnification, it is preferable to set a small curve. In addition, in a case in which there is an inclination between the planes 22a and 22b, a small inclination angle is desirable.

Second Embodiment

Hereinafter, a second embodiment will be described with reference to FIGS. 14 and 15.

A basic configuration of a display device according to the second embodiment is the same as that in the first embodiment, and a configuration of an optical element is different from that in the first embodiment. For this reason, descriptions of the entire display device are omitted, and only the optical element will be described.

Figure 14:
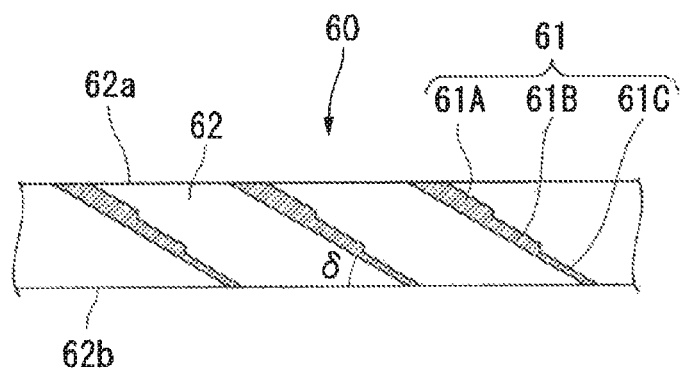
FIG. 14 is an enlarged view of an optical element according to a second embodiment.

FIG. 14 is a sectional view of the optical element according to the second embodiment. FIG. 14 corresponds to FIG. 4 in the first embodiment.

In FIG. 14, constituent elements which are common to those in FIG. 4 are given the same reference numerals, and descriptions thereof will be omitted.

Configuration of Optical Element

As illustrated in FIG. 14, an optical element 60 according to the second embodiment includes a plurality of partially reflecting surfaces 61, and a plurality of light transmitting members 62. In the optical element 60 according to the second embodiment, an inclination angle δ of the partially reflecting surface 61 is less than 45°. As in the embodiment, in a case in which the inclination angle δ of the partially reflecting surface 61 is less than 45°, a low reflectivity region 61C with a relatively low reflectance is provided on a side near to an emission plane 62b in an inclination direction of the partially reflecting surface 61 on the contrary to the first embodiment. In addition, in the inclination direction, a high reflectivity region 61A with a reflectance higher than that of the low reflectivity region 61C is provided on a side far from the emission plane 62b compared with the low reflectivity region 61C. An intermediate reflectivity region 61B with a refractive index between a refractive index of the low reflectivity region 61C and a refractive index of the high reflectivity region 61A is provided between the low reflectivity region 61C and the high reflectivity region 61A. That is, the high reflectivity region 61A, the intermediate reflectivity region 61B, and the low reflectivity region 61C are provided in this order from an incident plane 62a toward the emission plane 62b of the optical element 60.

Configurations other than that are the same as those in the first embodiment.

Effect of Embodiment: Effect with Respect to External Light

Hereinafter, a unique effect of the optical element 60 according to the embodiment will be described.

Figure 15:
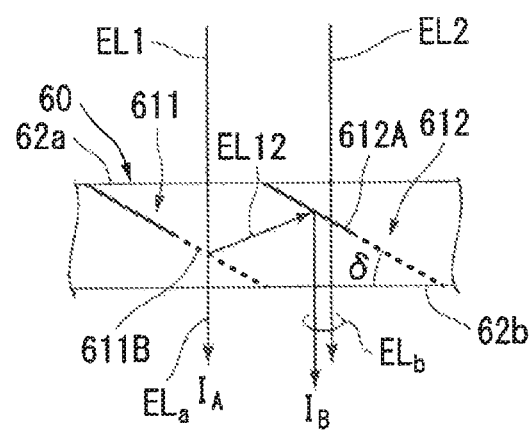
FIG. 15 is a diagram which describes an operation of the optical element according to the second embodiment.

FIG. 15 is a diagram which illustrates a model for describing an operation of the optical element 60 with respect to external light EL. Here, for easy descriptions, partially reflecting surfaces 611 and 612 with two regions having different reflectances are assumed. An inclination angle δ of the partially reflecting surfaces 611 and 612 is less than 45.

In two regions of the partially reflecting surfaces 611 and 612, a reflectance of a first region on a side far from the emission plane 62b is set to p, and a reflectance of a second region on a side near to the emission plane 62b is set to q.

As light input to pupils of an observer, two light beams of light ELa which passes through a first partially reflecting surface 611, and light EL12 which is reflected once by the first partially reflecting surface 611 are taken into consideration.

A portion of light in light EL1 is input to the first partially reflecting surface 611 after being input from the incident plane 62a. A portion of light in light which is input to the first partially reflecting surface 611 passes through a second region 611B of the first partially reflecting surface 611, and is output from the emission plane 62b. Another portion of light is reflected by the second region 611B of the first partially reflecting surface 611, and proceeds toward a first region 612A of a second partially reflecting surface 612.

Light reflected by the second region 611B of the first partially reflecting surface 611 is reflected by the first region 612A of the second partially reflecting surface 612. In addition, light which is directly input to the second partially reflecting surface 612 also reaches a reflection position of the second partially reflecting surface 612. For this reason, both of the light EL12 which is reflected by the second region 611B of the first partially reflecting surface 611, and is further reflected by the first region 612A of the second partially reflecting surface 612 and the light EL2 which is directly input to the first region 612A of the second partially reflecting surface 612, and passes through thereof are output from the reflection position of the second partially reflecting surface 612. An observer views light obtained by compositing these light beams.

Here, a relative intensity of the light ELa which is output from the first partially reflecting surface 611 is set to $I_A$, and a relative intensity of light ELb which is output from the second partially reflecting surface 612 is set to $I_B$.

The relative intensities $I_A$ and $I_B$ are expressed in the following expressions (7) and (8), respectively.

$$\text{Relative intensity } I_A : I_A = 1-q \quad (7)$$

$$\text{Relative intensity } I_B : I_B = (1-p) + q \times p \quad (8)$$

In a case in which a difference between the two relative intensities $I_A$ and $I_B$ is large, stripe patterns with delicate light and shade are formed, and diffraction of light occurs. As a result, a problem in which an external image becomes blurry occurs. Accordingly, it is necessary to set a difference between the relative intensities $I_a$ and $I_b$ to be small in order for an observer to visually recognize a clear external image. In the embodiment, in a case in which a relationship in size between the reflectance p and the reflectance q p>q is satisfied, a difference in relative intensity becomes small. That is, it is possible to set a difference in relative intensity to be small by setting a reflectance in a region on a side far from the emission plane 62b (observer) of the optical element 60 to be relatively large, and setting a reflectance in a region on a side near to the emission plane 62b to be relatively small. In this manner, according to the display device which includes the optical element 60 in the embodiment, it is possible to suppress an external image from being blurry.

A technical range of the embodiment is not limited to the above-described embodiments, and various modifications can be added without departing from the scope of the embodiment.

For example, in the above-described embodiment, the optical element is formed of the plurality of light transmitting members; however, it may be a configuration of including one light transmitting member. In such a case, it may be a configuration in which, for example, one face of the light transmitting member is formed in a saw tooth shape, and a partially reflecting surface is provided on a plurality of inclined faces which configure the saw tooth.

In addition, a specific configuration of each unit which configures the optical element and the display device, such as the number of each of constituent elements, and a shape, a material, or the like, thereof is not limited to the above-described embodiment, and can be appropriately modified. For example, as the image display unit, an organic EL device, a combination of a laser light source and an MEMS scanner, or the like, may be used, in addition to the above-described liquid crystal display device.

The entire disclosure of Japanese Patent Application No. 2016-063258, filed Mar. 28, 2016 is expressly incorporated by reference herein.

What is claimed is:

1. An optical element comprising:
a plurality of partially reflecting surfaces which are provided parallel to each other with intervals therebetween, which reflect a portion of image light and a portion of external light, and which transmit another portion of the image light or another portion of external light; and
a light transmitting member which supports the plurality of partially reflecting surfaces,
wherein the light transmitting member includes an incident plane which enters the image light and the external light, and an emission plane which emits the image light and the external light, and
wherein each of the plurality of the partially reflecting surfaces is disposed so as to be inclined with respect to the incident plane and the emission plane and has a plurality of regions having different reflectances in an inclination direction.

2. The optical element according to claim 1,
wherein the angle between the partially reflecting surface and the emission plane is 45° or more and less than 90°, and
wherein the partially reflecting surface includes a high reflectivity region which is located on a side near to the emission plane in the inclination direction, and a low reflectivity region which is located on a side far from the emission plane compared with the high reflectivity region in the inclination direction and whose reflectance is lower than that of the high reflectivity region.

3. A display device comprising:
an image display unit; and
a light-guiding unit which guides image light formed by the image display unit,
wherein the light-guiding unit includes an input unit that enters the image light, a light-guiding body which guides the image light entered from the input unit, and an output unit that emits the image light, and
wherein the output unit includes the optical element according to claim 2.

4. The optical element according to claim 1,
wherein the angle between the partially reflecting surface and the emission plane is less than 45°, and wherein the partially reflecting surface includes a low reflectivity region which is located on a side near to the emission plane in the inclination direction, and a high reflectivity region which is located on a side far from the emission plane compared with the low reflectivity region in the inclination direction and whose reflectance is higher than that of the low reflectivity region.

5. A display device comprising:

an image display unit; and a light-guiding unit which guides image light formed by the image display unit, wherein the light-guiding unit includes an input unit that enters the image light, a light-guiding body which guides the image light entered from the input unit, and an output unit that emits the image light, and wherein the output unit includes the optical element according to claim 4.

6. The optical element according to claim 1, wherein the partially reflecting surface is formed of a metal film.

7. A display device comprising:

an image display unit; and a light-guiding unit which guides image light formed by the image display unit, wherein the light-guiding unit includes an input unit that enters the image light, a light-guiding body which guides the image light entered from the input unit, and an output unit that emits the image light, and wherein the output unit includes the optical element according to claim 6.

8. The optical element according to claim 1, wherein the partially reflecting surface is formed of a dielectric multilayer film.

9. A display device comprising:

an image display unit; and a light-guiding unit which guides image light formed by the image display unit, wherein the light-guiding unit includes an input unit that enters the image light, a light-guiding body which guides the image light entered from the input unit, and an output unit that emits the image light, and wherein the output unit includes the optical element according to claim 8.

10. A display device comprising:

an image display unit; and a light-guiding unit which guides image light formed by the image display unit, wherein the light-guiding unit includes an input unit that enters the image light, a light-guiding body which guides the image light entered from the input unit, and an output unit that emits the image light, and wherein the output unit includes the optical element according to claim 1.

11. The display device according to claim 10, wherein the output unit is provided on a face on a viewing side of the light-guiding body.

12. A manufacturing method for an optical element comprising:

forming a partially reflecting surface having a plurality of regions having different reflectances by using a mask on one face of a light transmitting substrate, and manufacturing an element plate which is formed of the light transmitting substrate on which the partially reflecting surface is formed;

layering a plurality of the element plates by causing the partially reflecting surface to face the same direction, and manufacturing a layered body in which the plurality of element plates are layered; and cutting the layered body so that each of the partially reflecting surfaces is inclined with respect to a cutting face and disposing the plurality of regions in an inclination direction, thereby enabling the optical element to be manufactured.

\* \* \* \* \*